(12) United States Patent
Hill et al.

(10) Patent No.: US 11,426,937 B2
(45) Date of Patent: Aug. 30, 2022

(54) THREE DIMENSIONAL PRINTING SYSTEM ADAPTABLE TO VARYING RESIN TYPES

(71) Applicant: 3D Systems, Inc., Rock Hill, SC (US)

(72) Inventors: Rodney Hill, Mount Angel, OR (US); Keaton Jonathan Daniel Snyder, Donald, OR (US)

(73) Assignee: 3D Systems, Inc., Rock Hill, SC (US)

( * ) Notice: Subject to any disclaimer, the term of this patent is extended or adjusted under 35 U.S.C. 154(b) by 827 days.

(21) Appl. No.: 16/365,000

(22) Filed: Mar. 26, 2019

(65) Prior Publication Data

US 2019/0299529 A1    Oct. 3, 2019

Related U.S. Application Data

(60) Provisional application No. 62/649,018, filed on Mar. 28, 2018.

(51) Int. Cl.
*B29C 64/277* (2017.01)
*B29C 64/321* (2017.01)
(Continued)

(52) U.S. Cl.
CPC .......... *B29C 64/277* (2017.08); *B29C 64/106* (2017.08); *B29C 64/124* (2017.08);
(Continued)

(58) Field of Classification Search
CPC .... B29C 64/277; B29C 64/307; B29C 64/321
See application file for complete search history.

(56) References Cited

U.S. PATENT DOCUMENTS

2012/0164330 A1    6/2012  Swanson et al.
2016/0089839 A1    3/2016  Huang et al.
(Continued)

FOREIGN PATENT DOCUMENTS

| CN | 204725859 | 10/2015 |
|---|---|---|
| CN | 104325643 | 3/2018 |
| DE | 4417083 | 11/1995 |

OTHER PUBLICATIONS

PCT International Search Report the International Searching Authority for PCT/US2019/024058, dated Jul. 15, 2019 2019 (6 pages).
(Continued)

*Primary Examiner* — Michael M. Robinson

(57) ABSTRACT

A three dimensional printing system for manufacturing a three dimensional article includes a print engine, a receptacle, a pump motor system, a removable conduit assembly, and a resin container. The receptacle includes an upper portion with an opening and a lower interface portion. The removable conduit assembly includes: a fluid inlet extending upwardly from the lower interface portion; a pump head removably coupled to the pump motor system; a fluid outlet for supplying resin to the print engine. The resin container includes an internal reservoir and a leading and trailing end relative to a direction of insertion of the resin container into the receptacle. The resin container includes a fluid outlet that extends downwardly from the leading end. Installation of the resin container includes passing the leading end through the opening and lowering and coupling the leading end to the lower interface portion.

17 Claims, 15 Drawing Sheets

(51) Int. Cl.
  *B29C 64/393* (2017.01)
  *B29C 64/106* (2017.01)
  *B29C 64/307* (2017.01)
  *B33Y 10/00* (2015.01)
  *B29C 64/124* (2017.01)
  *B33Y 30/00* (2015.01)
  *B33Y 40/00* (2020.01)
  *B33Y 50/00* (2015.01)

(52) U.S. Cl.
  CPC .......... *B29C 64/307* (2017.08); *B29C 64/321* (2017.08); *B29C 64/393* (2017.08); *B33Y 10/00* (2014.12); *B33Y 30/00* (2014.12); *B33Y 40/00* (2014.12); *B33Y 50/00* (2014.12)

(56) References Cited

U.S. PATENT DOCUMENTS

| | | | |
|---|---|---|---|
| 2017/0050389 A1* | 2/2017 | Lee | B29C 64/357 |
| 2017/0100897 A1 | 4/2017 | Chen et al. | |
| 2017/0210064 A1* | 7/2017 | Aw | B29C 48/92 |
| 2019/0091931 A1* | 3/2019 | Chanclon | B29C 64/165 |

OTHER PUBLICATIONS

PCT Written Opinion of the International Searching Authority for PCT/US2019/024058, dated Jul. 15, 2019 2019 (8 pages).

* cited by examiner

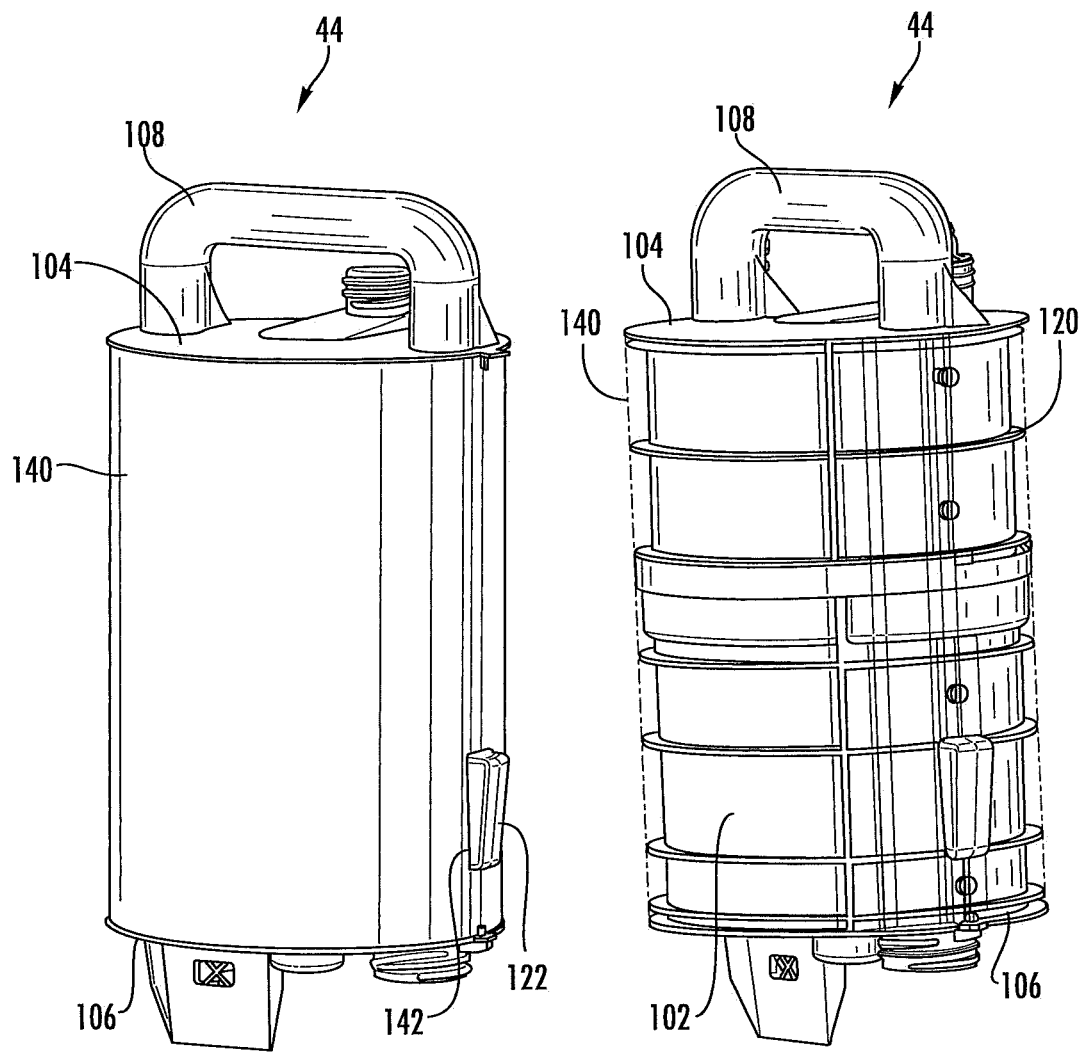

THREE DIMENSIONAL PRINTING SYSTEM ADAPTABLE TO VARYING RESIN TYPES

CROSS-REFERENCE TO RELATED APPLICATIONS

This non-provisional patent application claims priority to U.S. Provisional Application Ser. No. 62/649,018, Entitled "THREE DIMENSIONAL PRINTING SYSTEM ADAPTABLE TO VARYING RESIN TYPES" by Rodney Hill et al., filed on Mar. 28, 2018, incorporated herein by reference under the benefit of U.S.C. 119(e).

FIELD OF THE INVENTION

The present disclosure concerns a system for delivering a photocurable resin to a three dimensional printing system. More particularly, the present disclosure concerns an apparatus that allows resin-carrying components to be quickly removed and replaced for maintenance or changing resins.

BACKGROUND

Three dimensional printing systems that utilize curable resins are in wide use. Such systems can utilize variety of resins such as photocurable liquids, resin binders, support material resins, and various treatment fluids. Challenges with such systems include reliability, maintenance, contamination, and a desire to utilize different and/or improved formulations. There is a need for a system that allows for maintenance or changing resins with minimal difficulty and no contamination.

BRIEF DESCRIPTION OF THE FIGURES

FIG. 7D is a side view of an embodiment of a resin container which includes an outer shell.

FIG. 7E is a side view of an embodiment of a resin container which illustrates how an outer shell covers features of a housing.

SUMMARY

Figure 1:
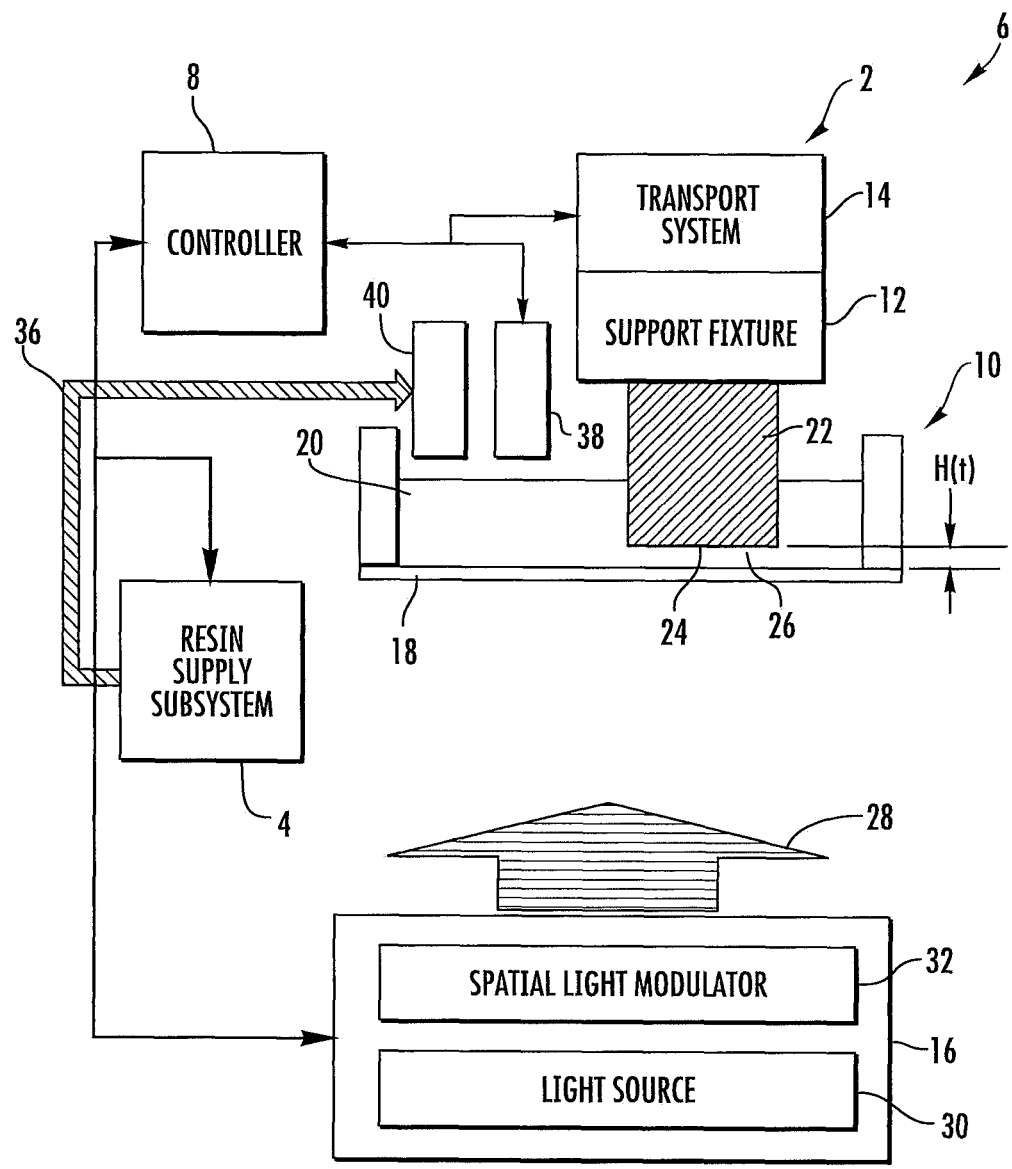
FIG. 1 is a block diagram schematic of an embodiment of a three dimensional printing system.

In a first aspect of the disclosure, a three dimensional printing system for manufacturing a three dimensional article includes a print engine, a receptacle, a pump motor system, a removable conduit assembly, and a resin container. The receptacle includes an upper portion with an opening and a lower interface portion. The removable conduit assembly includes: a fluid inlet extending upwardly from the lower interface portion; a pump head removably coupled to the pump motor system; a fluid outlet for supplying resin to the print engine. The resin container includes an internal reservoir and a leading and trailing end relative to a direction of insertion of the resin container into the receptacle. The resin container includes a fluid outlet that extends downwardly from the leading end. Installation of the resin container includes passing the leading end through the opening and lowering and coupling the leading end to the lower interface portion. The container fluid outlet couples with the conduit assembly fluid inlet. The removable conduit assembly and resin container provide a sealed fluid path from the internal reservoir to the print engine. This enables a user to quickly and easily change a system to a new resin type by removing and replacing the resin container and the conduit assembly. A controller is configured to monitor sensors and control portions of the three dimensional printing system.

In one implementation the lower interface portion includes a latching mechanism for securing the conduit assembly fluid inlet in a quick and convenient manner. The latching mechanism can include a latching door and a latch. A fixed end of the latching door is attached to an interface chassis at a hinge. A free end of the latching door includes a detent. The latch is pivotally attached to the lower interface portion near the free end of the latching door. The latch includes a spring and a pin. Initially the door can be closed with the fluid inlet between the interface chassis and the latching door with the pin held into the detent by the spring. The door is released by pulling out the latch (and hence the pin from the detent), rotating the latch out of the way, and then rotating out the door. The fluid inlet can then be removed and replaced. The latching door is then swung closed and the pin returned to the detent.

In another implementation the lower interface portion includes a motorized rotary actuator coupled to a stirring motor. The motorized rotary actuator extends upwardly. The resin container includes a gear coupled to an impeller within the internal reservoir. The gear extends downwardly from the leading end of the resin container. Insertion of the resin container into the receptacle causes the gear to engage the motorized rotary actuator and the stirring motor can operate the impeller to stir resin within the internal reservoir. The gear is laterally located at a central location of the leading end of the resin container so that it is axially aligned with an axial shaft about which the impeller turns.

In yet another implementation the lower interface portion includes an upwardly extending electrical connector. The resin container includes an electrical connector extending downwardly from the leading end and electrically coupled to an information storage device. Insertion of the resin container into the receptacle causes the electrical connectors to couple and the controller can read from and write to the information storage device on the resin container. The container connector includes an array of laterally facing contact pads. The lower interface connector includes an array of spring contacts which engage the contact pads along a lateral axis.

In a further implementation the pump motor system includes a mounting surface, a pump motor, a pump actuator, and a plurality of mounting features. The pump head is a peristaltic pump head including a deformable tube between a pump housing and a rotary roller. The pump housing also includes a plurality of mounting features. Attaching the pump head to the pump motor system includes placing the pump housing on the mounting surface so that the pump actuator engages the rotary roller. The mounting features of the pump head are also coupled to the mounting features of the pump motor system. This coupling can include one or more of applying a thumb screw, magnetic coupling, or press fitting a pin into a hole.

In a yet further implementation, the opening in the upper portion of the receptacle and a vertical surface of the resin container have complementary shapes to properly align the resin container with the receptacle. The opening can include an outwardly extending slot. The resin container can include an outwardly extending rib that is lined up with the slot to properly orient and align the resin container with respect to the receptacle.

In another implementation the controller includes a processor and an information storage device. The information storage device includes a non-transient or non-volatile portion that stores software instructions. When executed by the processor, the software instructions read information from memory, receives signals from sensors, and operate the three dimensional printing system. The controller can be located at one location or distributed at plural locations within the three dimensional printing system.

DETAILED DESCRIPTION OF THE PREFERRED EMBODIMENTS

FIG. 1 is a block diagram schematic of an embodiment of a three dimensional printing system 2 that includes a resin supply subsystem 4 providing resin to a print engine 6 under control of controller 8. In describing printing system 2 axes X, Y, and Z are used to illustrate positions, directions, and motions. Axes X, Y, and Z are mutually orthogonal. Axes X and Y are "lateral" or "horizontal" axes. Axis Z is a "vertical" axis. Axis Z is typically aligned or nearly aligned with a gravitational reference.

The print engine 6 includes a resin vessel 10, a support fixture 12 coupled to a motorized transport system 14, and a light engine 16. The resin vessel 10 includes a transparent sheet 18 on a lower side and contains a photocurable resin 20. The support fixture 12 supports a three dimensional article 22 having a lower face 24 in facing relation with the transparent sheet 18. Between the transparent sheet 18 and lower face 24 is a thin layer of the resin 20 defining a build plane 26 that is proximate to the lower face 24.

The transport system 14 is configured to vertically position the support fixture 12. The transport system 14 is thereby configured to control an optimal distance H(t) between the transparent sheet 18 and the lower face 24 during the manufacture of the three dimensional article 22.

The light engine 16 generates and projects pixelated light 28 up through the transparent sheet and to the build plane 26. The application of the pixelated light 28 selectively hardens a layer of the resin 20 at the build plane 26 and onto the lower face 24. In the illustrated embodiment, the light engine 16 includes a light source 30 and a spatial light modulator 32.

The resin supply subsystem 4 includes a conduit assembly 36 and a resin level sensor 38. The conduit assembly 36 includes a fluid outlet 40 positioned above the resin vessel 20. Resin 20 is transported through conduit assembly 36 and then dispensed into resin vessel 10.

Controller 8 is configured to receive signals from sensors such as resin level sensor 38 and to control transport system 14, light engine 16, resin supply subsystem 4, and other portions of the printing system 2. The controller 8 can have one location or multiple locations within the printing system 2. The controller 8 includes a processor coupled to an information storage device. The information storage device includes a non-transient or a non-volatile media storing software instructions. The software instructions are executed by the processor to read signals from sensors and to operate portions of the printing system 2.

While a particular embodiment of the print engine 6 is depicted in FIG. 1, variations are possible. In one alternative embodiment, the print engine 6 is a stereolithography print engine with lasers that cure top layers of a three dimensional article as it is being lowered into a tank of resin. In another alternative, the print engine 6 utilizes an piezoelectric printer to selectively dispense layers of a photocurable resin onto a three dimensional article.

Figure 2:
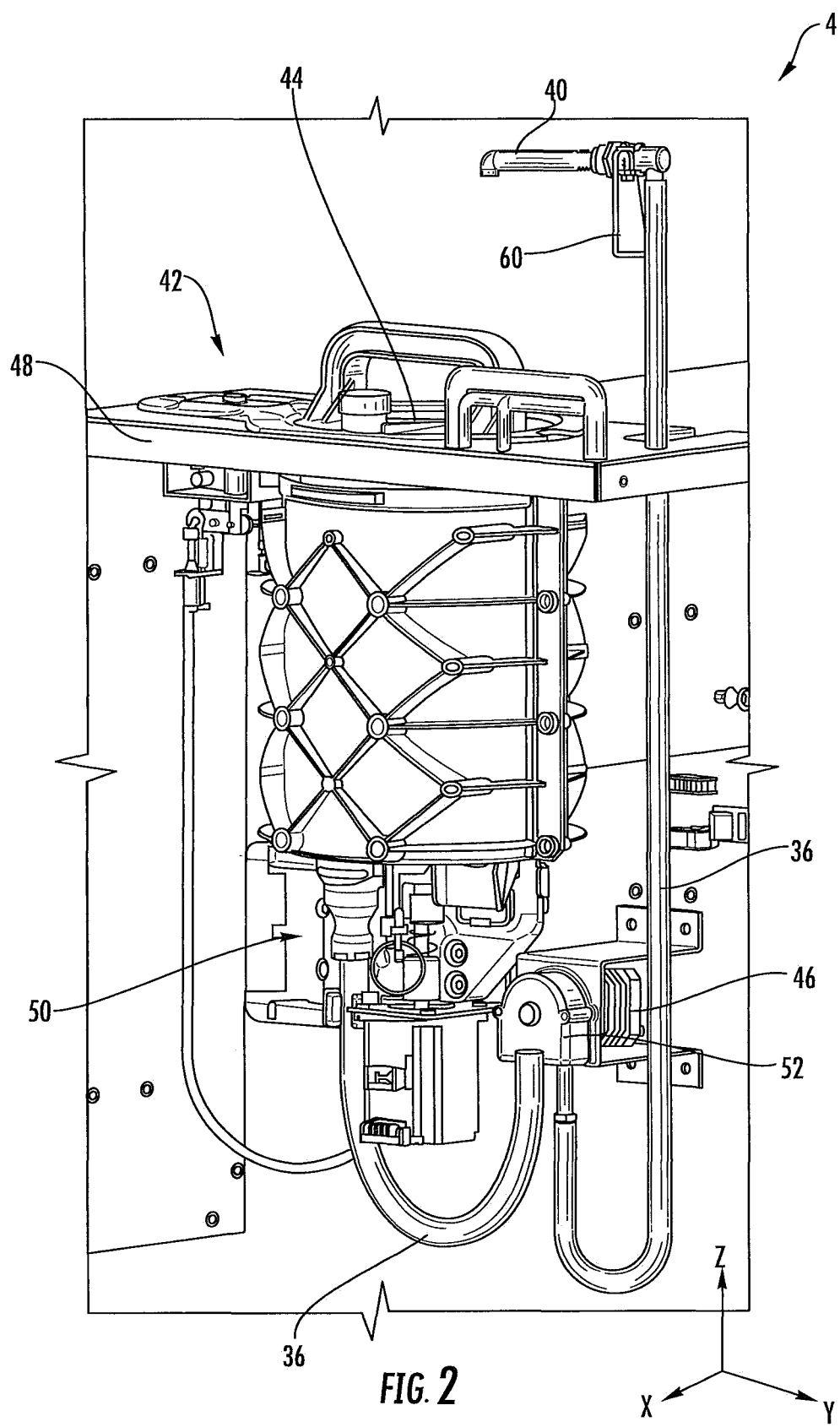
FIG. 2 is an isometric view of a of a resin supply subsystem which includes a receptacle, a resin container installed into the receptacle, and a conduit assembly.

FIG. 2 is an isometric view of an embodiment of a resin supply subsystem 4 for supplying the resin 20 to the print engine 6. The resin supply subsystem 4 includes a receptacle 42, a resin container 44, the conduit assembly 36, and pump motor system 46.

The receptacle 42 is configured to receive, align, and couple to the resin container 44. The receptacle 42 includes an upper portion 48 and an interface portion 50 which will be discussed in more detail infra. At the interface portion 50, the resin container 44 is fluidically coupled to the conduit assembly 36.

The conduit assembly 36 includes a pump head 52 that is mechanically coupled to the pump motor system 46. In response to an operation of the pump motor system 46, resin flows out of the resin container 44, through the conduit assembly 36, and to the print engine 6.

Conduit assembly 36 and resin container 44 are easily removed and replaced from the printing system 2. This allows the printing system 2 to be changed from a first (old) resin to a second (new) resin with minimal difficulty by removing and replacing resin container 44, conduit assembly 36, and the resin vessel 10. Because no other portion of printing system 2 is contacted by resin, contamination of the second resin by the first resin is avoided while allowing a very rapid changeover. The conduit assembly 36 and resin container 44 can be provided together as a kit for quickly changing out resin from a previous version of resin to that contained within resin container 44.

Figure 3:
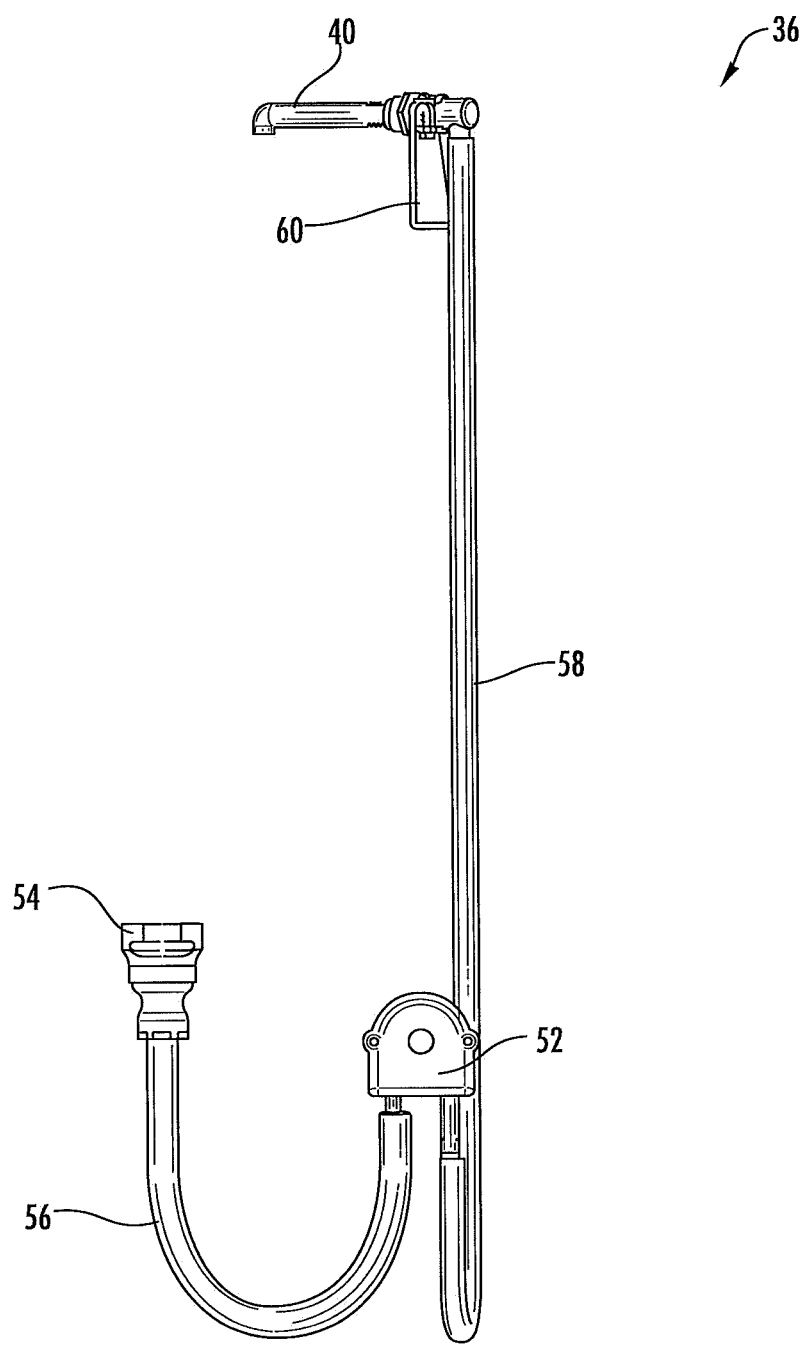
FIG. 3 is an isometric view of an embodiment of a replaceable conduit assembly.

FIG. 3 is an isometric view of an embodiment of a replaceable conduit assembly 36 in isolation. Conduit assembly 36 includes fluid inlet 54, first conduit 56, pump head 52, second conduit 58, and fluid outlet 40. In the illustrated embodiment, the fluid outlet 40 includes a mounting feature 60 for quickly mounting the fluid outlet 40 above the resin vessel 10. In the discussion infra, further details are provided for the way the conduit assembly can be quickly removed and replaced from the printing system 2.

Figure 4A:
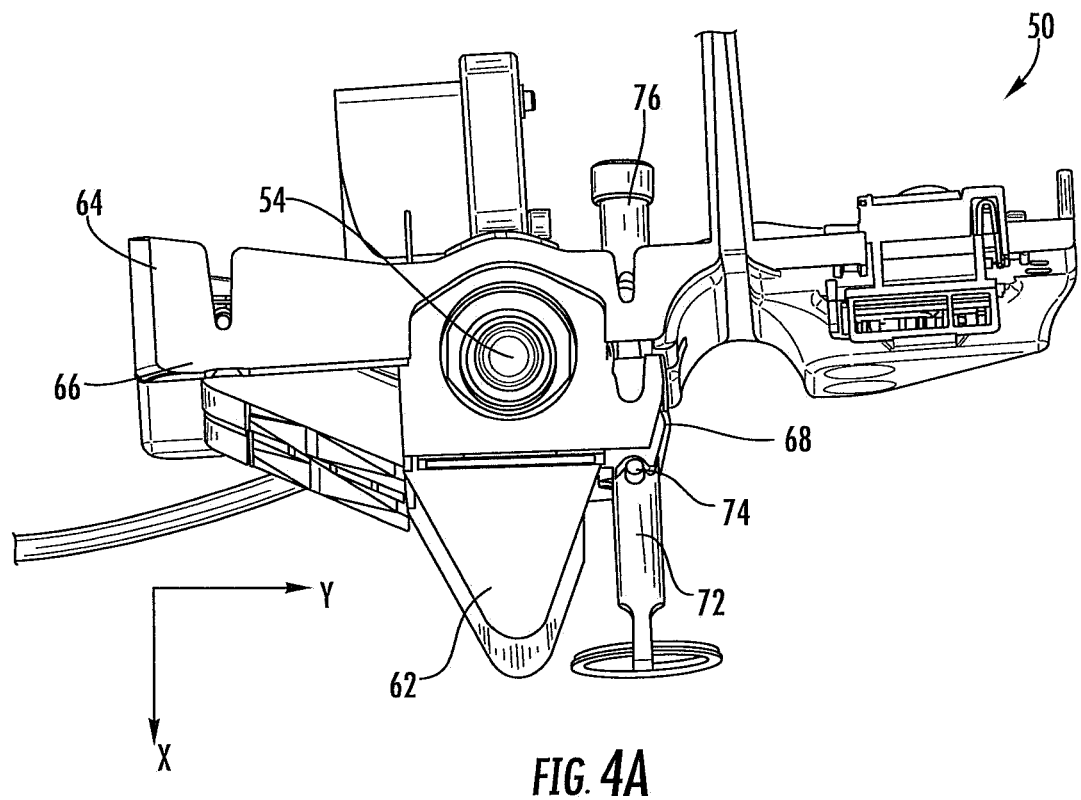
FIG. 4A is a top view of an embodiment of an interface portion of a receptacle. The interface portion includes a latching door that secures a fluid inlet in a latched configuration. The latching door is held in a closed position by a latch having a pin extending therefrom. A spring force on the latch urges a latch pin against a detent in the door which maintains the door in the closed or latched configuration.
Figure 4B:
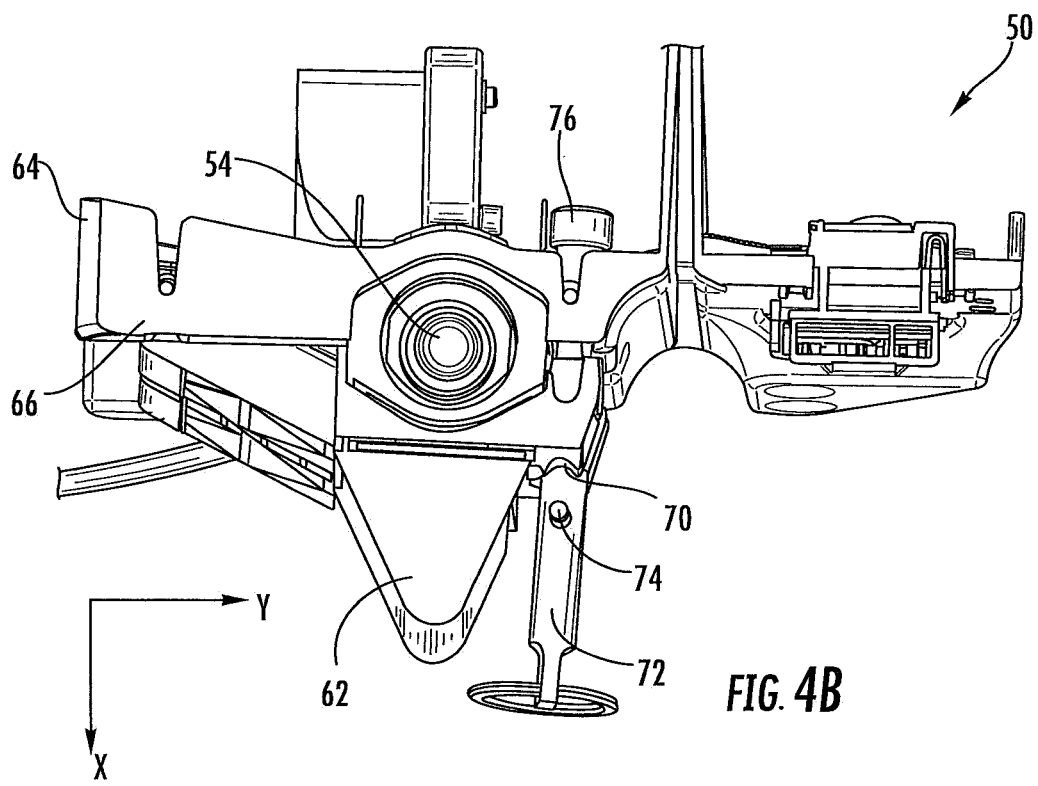
FIG. 4B is similar to FIG. 4A except that the latch is being pulled outwardly and the latch pin has been displaced away from the detent.

FIGS. 4A-D are top views illustrating an unlatching sequence of the fluid inlet 54 of the conduit assembly 36 from the interface portion 50 of receptacle 42. FIG. 4A depicts a latching door 62 in a latched state. The fluid inlet 54 is secured between the latching door 62 and an interface chassis 64. The latching door 62 is attached at one end to a door hinge 66 which defines a vertical axis 66 about which the door hinge 66 rotates. The latching door 62 has a free end 68 that rotates about door hinge 66 and includes a detent 70 (FIG. 4B). A spring loaded latch 72 includes a pin 74 that is urged against (and seated in) the detent 70 by a spring 76. The action of pin 74 against and within detent 70 thereby secures the door 62 in the latched state. In the illustrated embodiment there can be two pins 74 that extend vertically in the plus and minus Z direction from the latch 72. The pin or pins 74 exert a lateral seating force on the detent in a −X direction.

FIG. 4B depicts the latch 72 being pulled and extended against the spring 76 so that the pin 74 is no longer seated in the detent 70. The latch 72 is being pulled and extended laterally in the +X direction. This extension unseats the pin 74 from the detent 70.

Figure 4C:
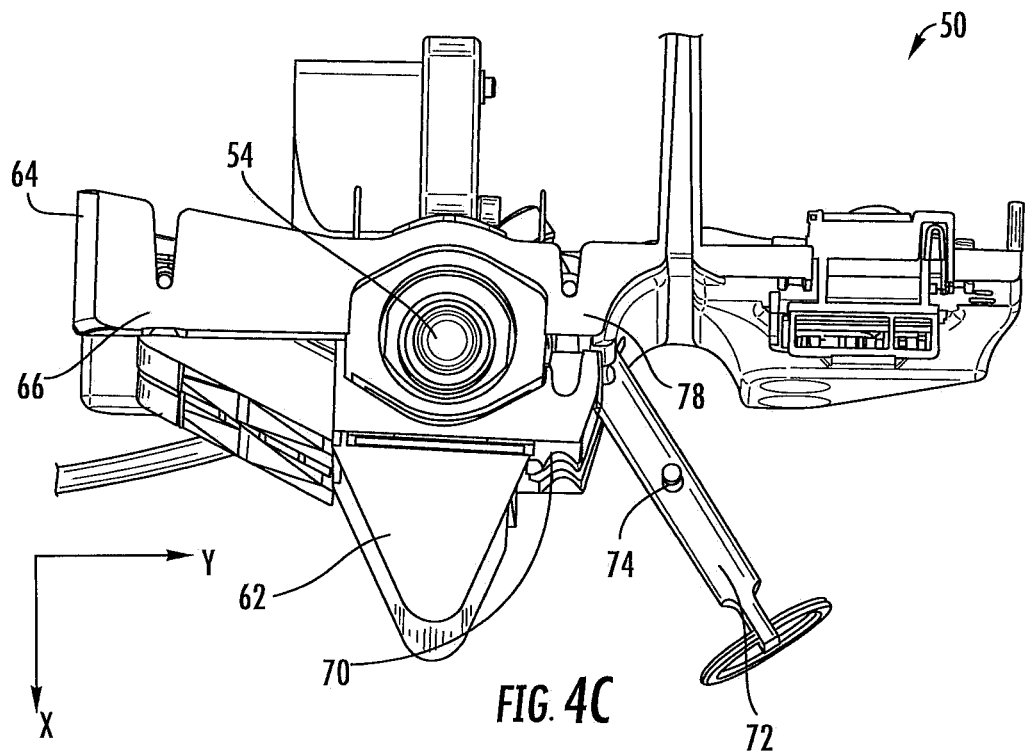
FIG. 4C is similar to FIG. 4B except that the latch has been rotated away from a free end of the latch door.

See FIG. 4C. The latch 72 is mounted to the interface chassis at a latch hinge 78. The latch 72 rotates about a vertical axis defined by the latch hinge 78. The latch 72 is being rotated outwardly away from the free end 68 of the latching door 62 about the latch hinge 78. With the depicted rotation, the pin 74 will not interfere with outward rotation of the latching door 62.

Figure 4D:
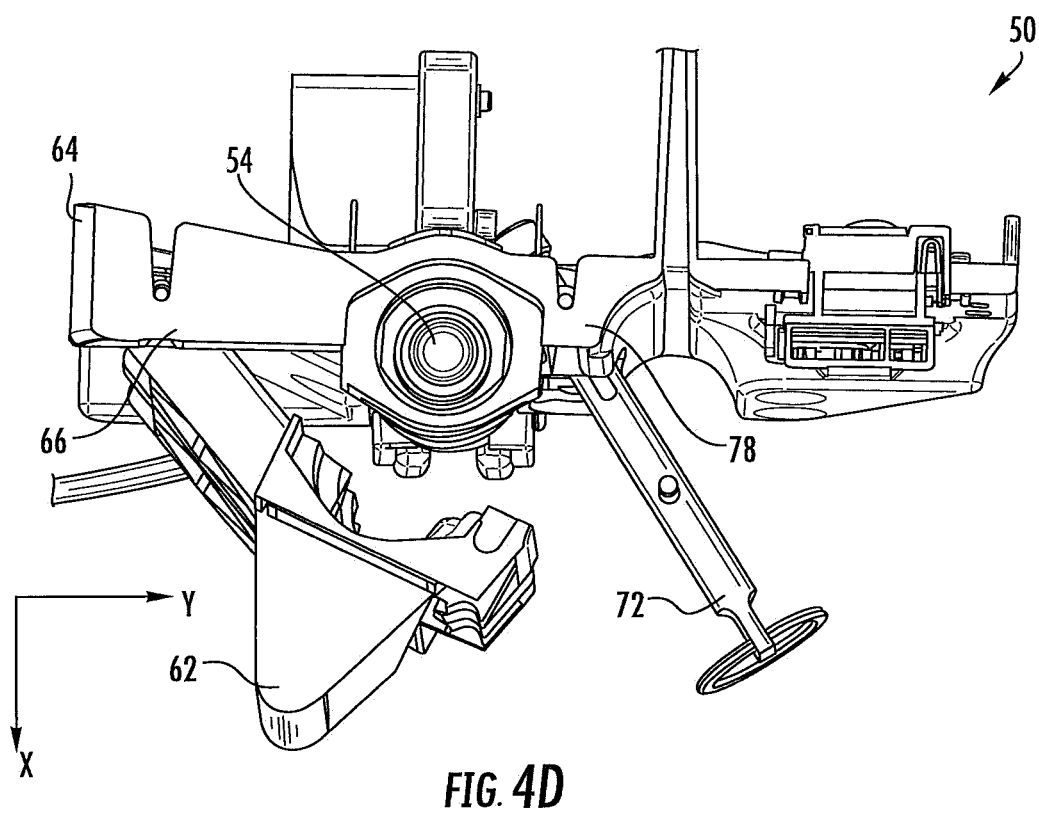
FIG. 4D is similar to FIG. 4C except that the latch door has been rotated outwardly to allow the fluid inlet of the conduit assembly to be removed from the interface portion.

FIG. 4D depicts the latching door 62 in an opened state to allow fluid inlet 54 to be removed from the interface portion 50 and replaced. Then the latching door can 62 be returned to the latched state by following a reverse order for the steps just described: (1) the latching door 62 is rotated inwardly around the door hinge 66 (FIG. 4D to FIG. 4C); (2) the latch 72 is rotated around the latch hinge 78 until pin 74 is in alignment with the detent 70 (FIG. 4C to FIG. 4B); (3) the spring 76 is allowed to retract the latch inwardly in the −X direction until the pin 74 rests in detent 70 (FIG. 4B to FIG. 4A).

Figure 5A:
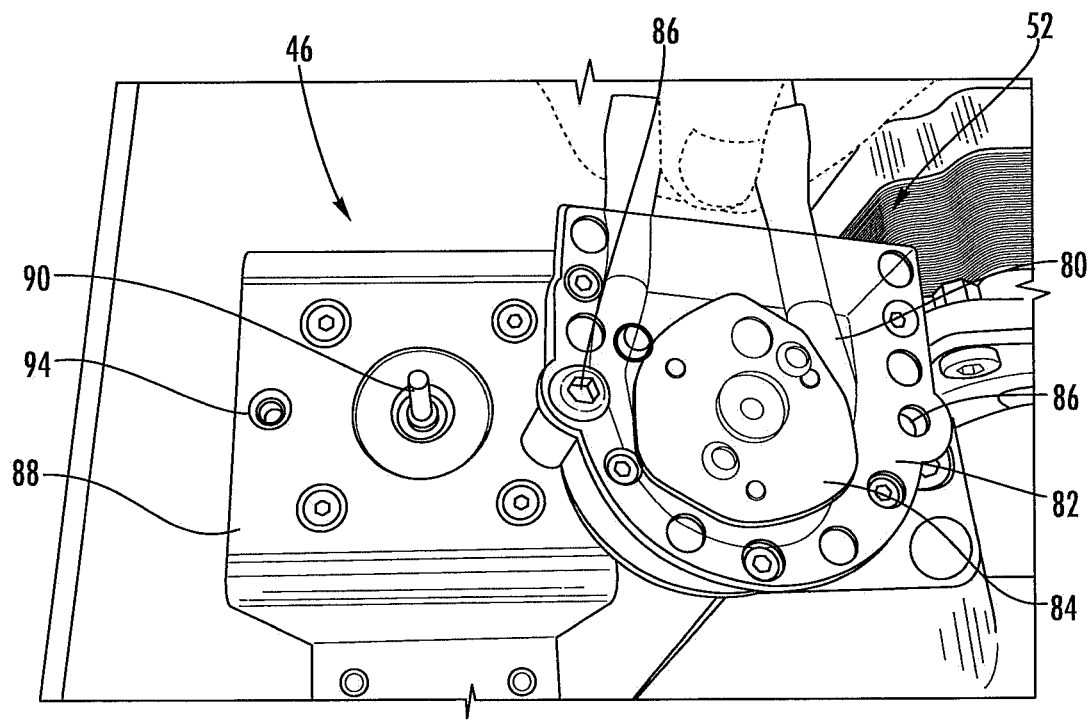
FIG. 5A is an isometric view of an embodiment of a pump head about to be mounted to a pump motor system.
Figure 5B:
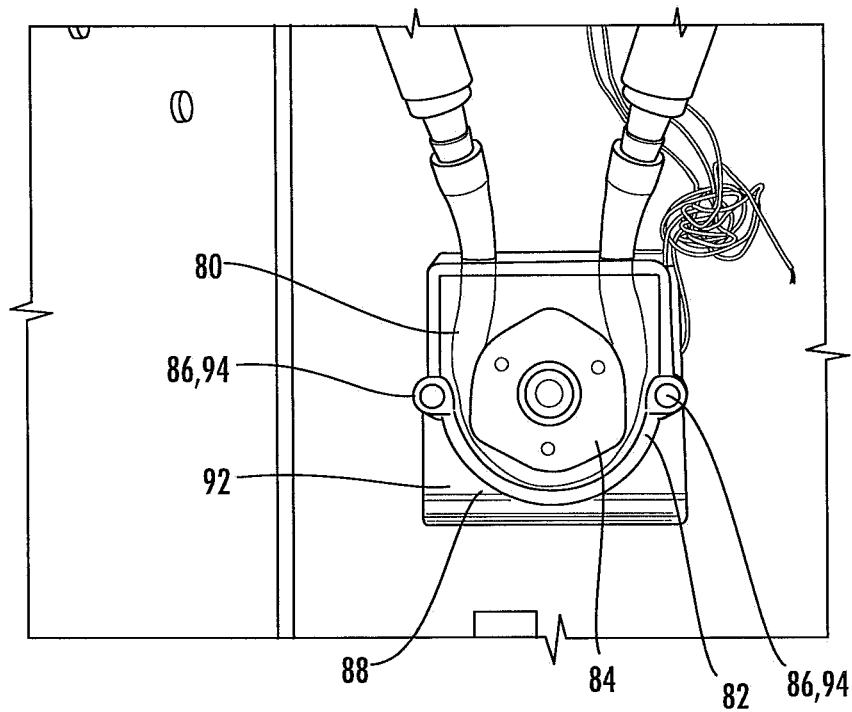
FIG. 5B is an isometric view of an embodiment of the pump head mounted to the pump motor system.

FIGS. 5A and 5B are isometric drawings depicting the mounting of a pump head 52 to the pump motor system 46. The pump head 52 is a peristaltic pump head 52 with a deformable tube 80 between an outer housing 82 and a rotary roller 84. The outer housing 82 includes a plurality of mounting features 86 for mounting the pump head to the pump motor system 46.

The pump motor system 46 includes a mounting surface 88, a pump actuator 90, and a pump motor 92 (under the mounting surface 88). The pump motor 92 is coupled to the pump actuator 90. The mounting surface 88 includes a plurality of mounting features 94.

Mounting or coupling the pump head 52 to the pump motor system 46 is a very quick process. First, the pump head 52 is placed against the mounting surface 88 and the pump actuator 90 engages the rotary roller 84. Second, the complementary mounting features (86 and 94) are coupled together. In one embodiment, the mounting features (86 and 94) are aligned holes and include hand assembled thumb screws that pass through the aligned holes and secure the outer housing 82 to the mounting surface 88. In another embodiment, the complementary mounting features (86 and 94) are magnetic materials that mutually attract each other. In yet another embodiment, the complementary mounting features (86 and 94) include combinations of pins and openings that are press fit together to provide a friction-based mounting. In a further embodiment, the complementary mounting features (86 and 94) include a combination of wrench-adjustable screws and threaded holes. These are but a few examples.

With the pump head 52 mounted to the pump motor system 46, the pump motor 92 can now controllably rotate the rotary roller 84. Rotation of the rotary roller 84 progressively squeezes the tube 80 to impart fluid motion according to the direction of the rotation.

Figure 6:
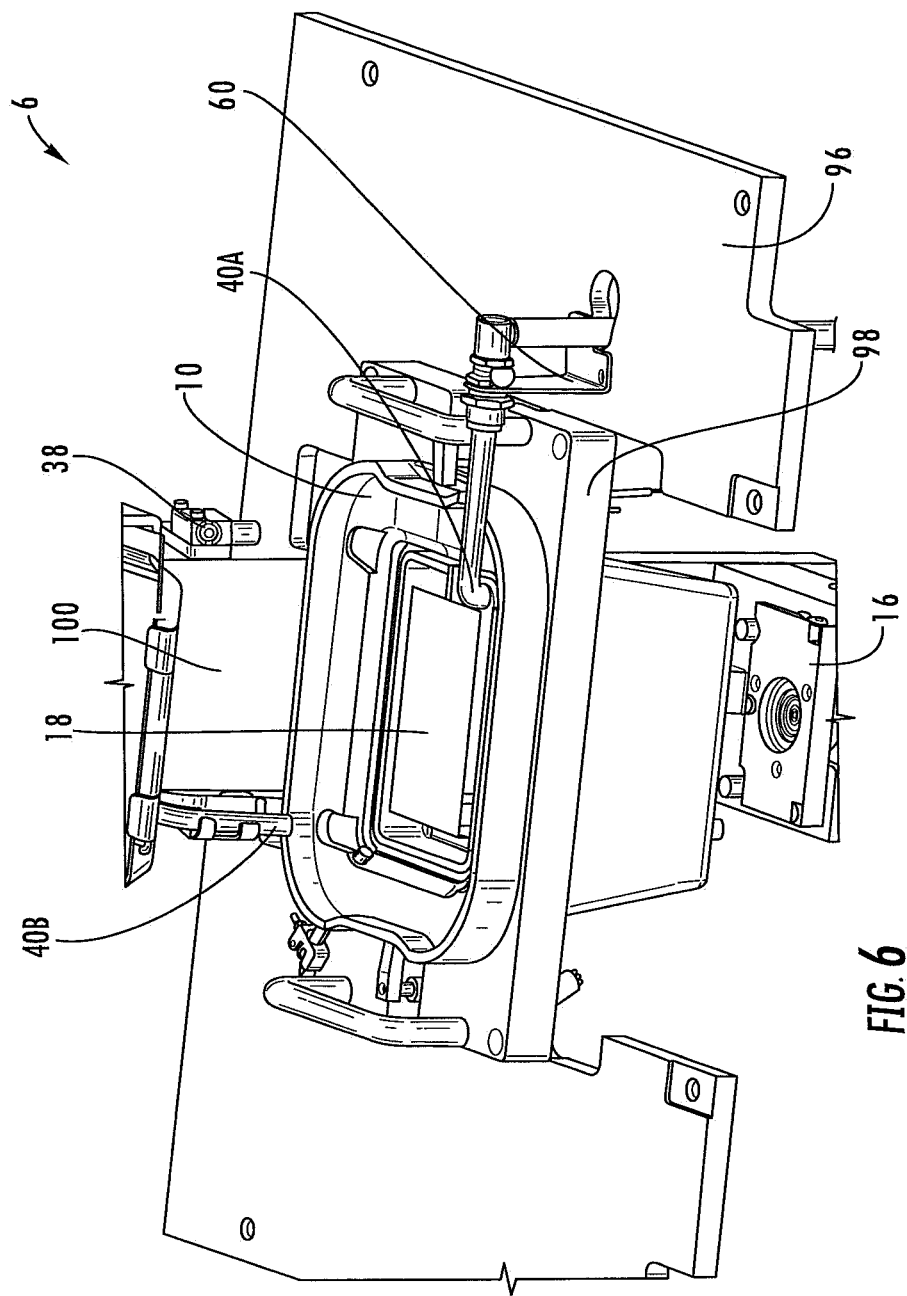
FIG. 6 is an isometric view of an embodiment of a print engine and a conduit assembly fluid outlet. Two alternative mounting locations of the fluid outlet are shown for dispensing resin into a resin vessel.

FIG. 6 is an isometric view of a portion of an embodiment of the print engine 6 illustrating ways in which the conduit assembly 36 provides photocurable resin 20 to the resin vessel 10. The mounting feature 60 is shown mounted to a support 96 proximate to a support plate 98 that supports the resin vessel 10. The conduit assembly fluid outlet 40 (40A in FIG. 6) is disposed above a portion of the resin vessel. The mounting feature 60 and support 96 can include complementary mounting features such as screws, thumbscrews, magnets, compressible pins, or other means for quickly mounting the fluid outlet 40 to dispense or delivery resin to the resin vessel 10.

In another embodiment, the mounting feature 60 can be mounted to the support plate 98. In yet another embodiment, the fluid outlet 40 can be supported proximate to a main support 100 which supports the support plate 98 (see element 40B near the main support 100). In one embodiment a support is provided for both the fluid outlet 40B and a non-contact sensor 38.

FIGS. 7A-E depict an embodiment of resin container 44 in more detail.

Figure 7A:
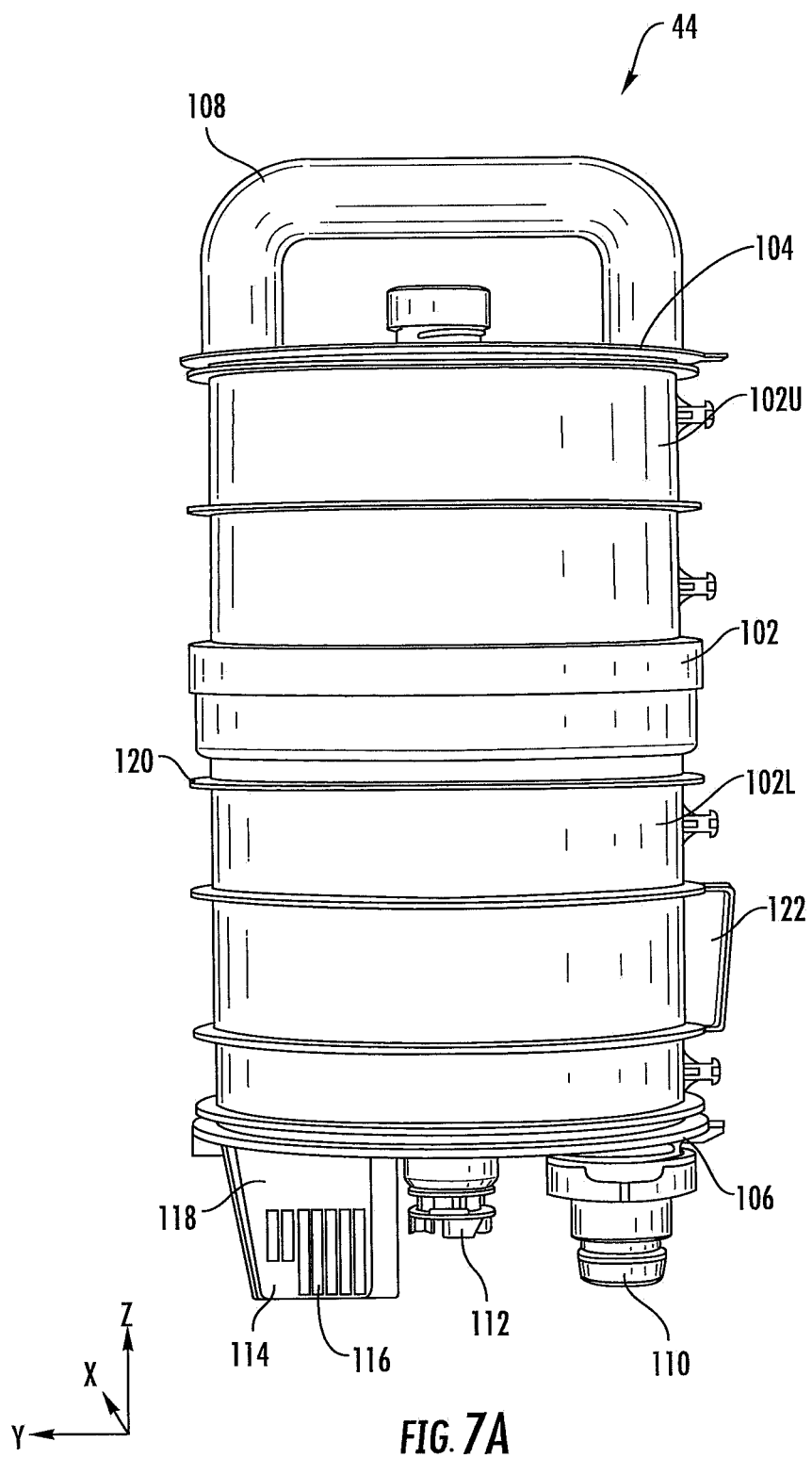
FIG. 7A is a side view of an embodiment of a resin container.

FIG. 7A depicts a side view of resin container 44 without an outer shell (to be illustrated infra). Resin container 44 includes a housing 102 which includes an upper housing portion 102U and a lower housing portion 102L. Resin container 44 has a trailing end 104 and a leading end 106 relative to a direction (vertically downward or −Z) of installation into the receptacle 42. Extending upwardly from the trailing end 104 is a handle 108 for hand-manipulating the resin container 44 down into and up out of the receptacle 42.

Extending downwardly from the leading end 106 is a fluid outlet 110, a gear 112, and an electrical connector 114. The electrical connector includes a plurality of contact pads 116 that are electrically coupled to an information storage device 118.

The outer housing 102 includes a plurality of ribs 120 that provide structural reinforcement and rigidity for the outer housing 102. Also extending from an outside surface of housing 102 is an aligning feature or rib 122 for aligning the resin container 44 into the receptacle 42.

Figure 7B:
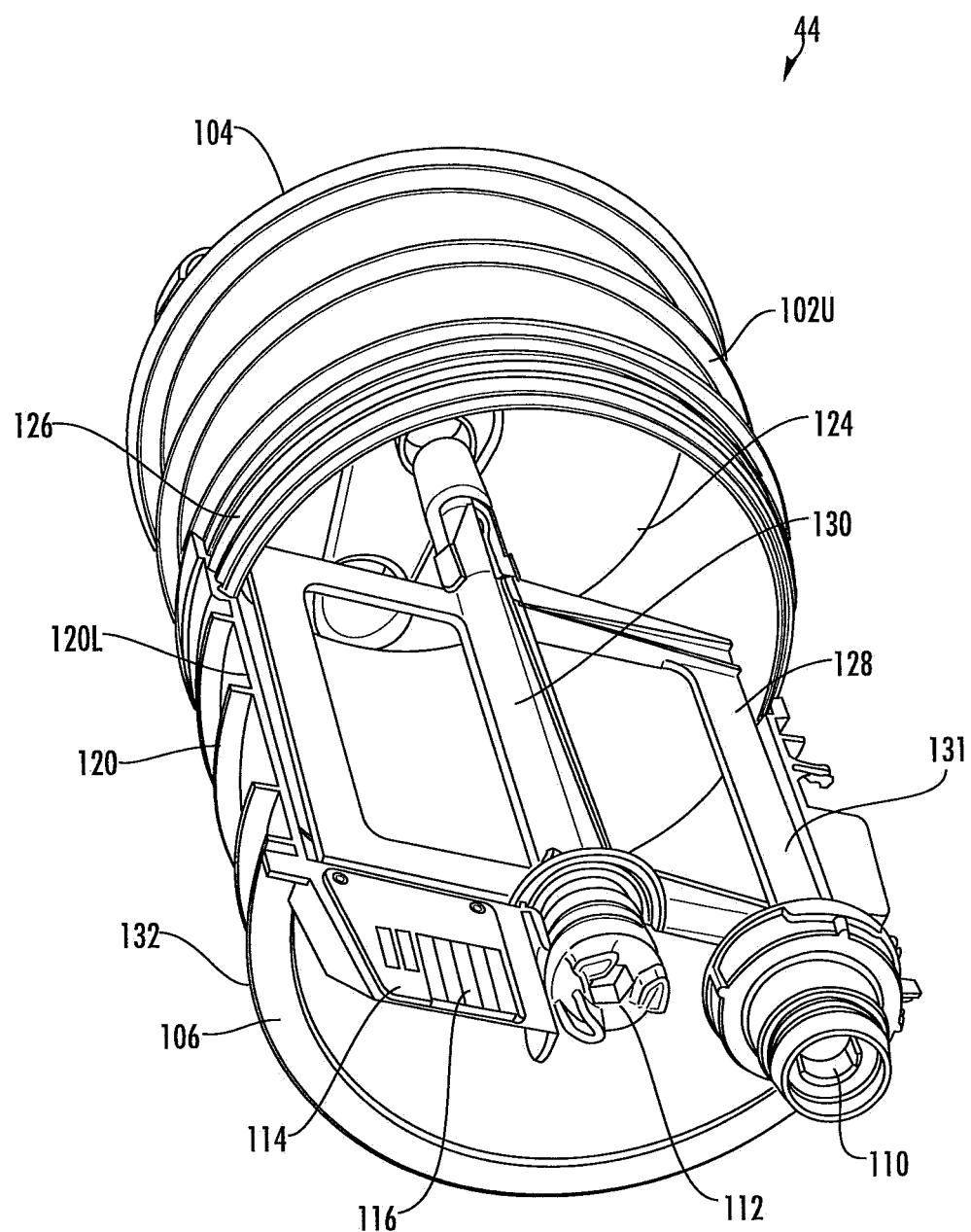
FIG. 7B is an isometric view of an embodiment of a resin container. This includes a cutaway view with a portion of a lower housing cut away to illustrate internal components of the resin container.

FIG. 7B is an isometric illustration of the resin container 44 which provides a cutaway view of the lower housing 102L in order to illustrate certain internal components. The upper housing 102U and lower housing 102L assemble to define an internal reservoir 124 within for containing the resin 20. An O-ring 126 provides a seal between an outside cylindrical surface of the upper housing 102U and an inside cylindrical surface of the lower housing 102L.

Disposed within the internal reservoir 124 is an impeller 128 for stirring the resin 20. The impeller 128 is coupled to the gear 112 and turns about a vertical axial shaft 130 that is supported by and rotatably mounted to the trailing 104 and leading 106 ends of the housing 102. The impeller 128 includes at least two blades 131 that extend radially from the axial shaft 130. The blades 131 rotate about a vertical axis of rotation defined by the axial shaft 130.

The fluid outlet 110, the gear 112, and the electrical connector 114 are arranged along the lateral axis Y. The planar arrangement of contact pads 116 are arranged along the lateral axis Y so that they face in a lateral direction −X that is perpendicular to Y. See FIGS. 7A and 7C concerning the axes. In the illustrated embodiment, the gear 112 is positioned centrally relative to the leading end 106 and is centered on the axial shaft 130. The fluid outlet 110 is positioned between the gear 112 and a peripheral edge 132 of the leading end 106. The electrical connector 114 is also positioned between the gear 112 and the peripheral edge 132 at an opposing position relative to the fluid outlet 110.

Figure 7C:
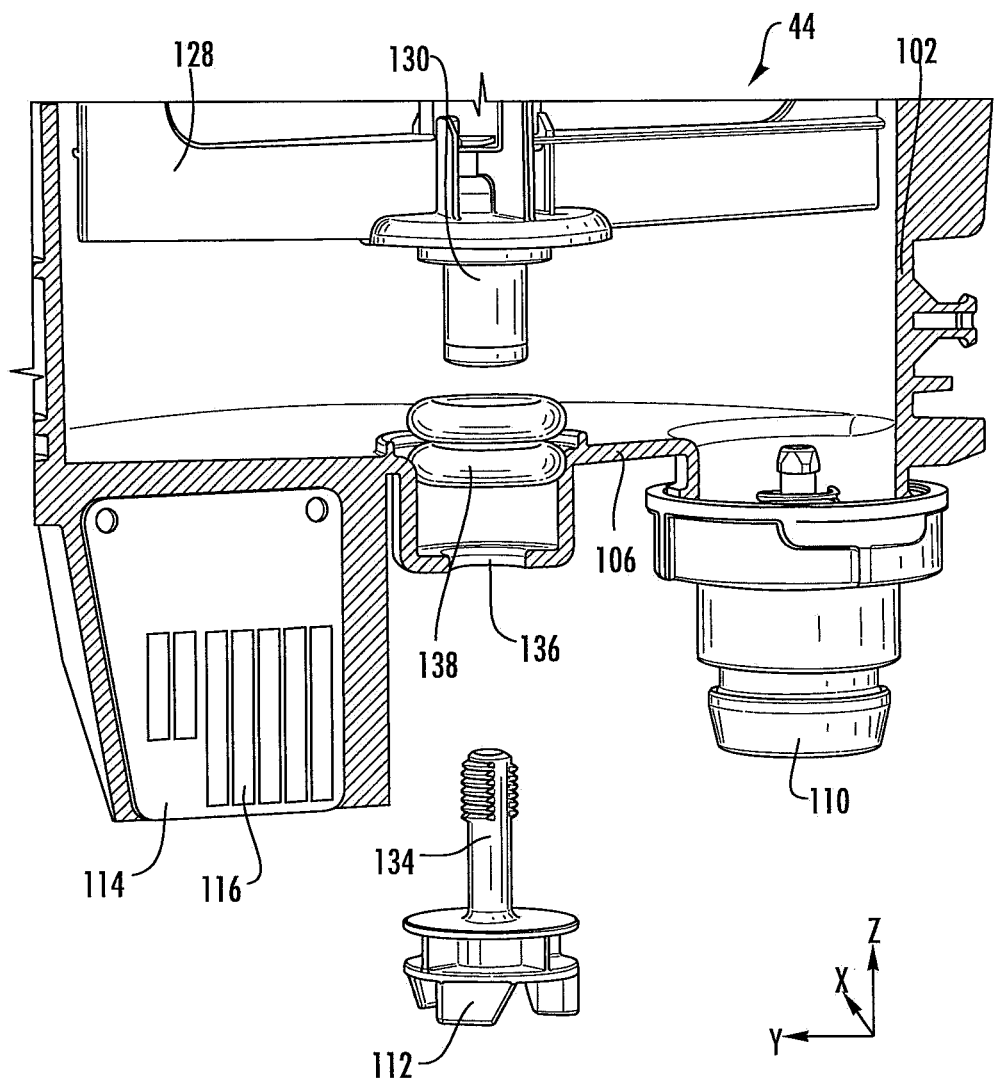
FIG. 7C is a close up side cutaway view of an embodiment of a resin container with just a leading end visible.

FIG. 7C is a close-up view of the leading end 106 of the resin container 44. The gear 112 is shown disconnected from the impeller 128. The gear 112 includes an upwardly extending threaded shaft 134 for coupling to the vertical shaft 130. When assembled, the shaft 134 passes through opening 136 in leading end 106 and is sealed to the leading end 106 by O-ring seals 138. The shafts 130 and 134 are axially aligned and define a vertical central axis for the resin container 44.

In FIG. 7B the resin container 44 is illustrated as having a circular lateral cross section with a centrally located gear 112 that is axially aligned with the impeller 128. In one alternative embodiment, the gear 112 can be off-center and coupled to the impeller 128 by a gear train including one or more additional gears. In another alternative embodiment, the resin container 44 can have an elongate lateral cross section (such as a rounded rectangle) and include plurality of impellers 128 that have separate gears 112 that are off-center. In yet another alternative embodiment the resin container 44 can include a plurality of impellers 128 that are coupled together as a gear train and coupled to a single gear 112.

FIGS. 7D and 7E depict the resin container 44 with an outer shell 140 (shown in ghost in FIG. 7E) that closely covers the support ribs 120. Extending through an opening 142 in the shell 140 is the aligning feature 122.

Figure 8A:
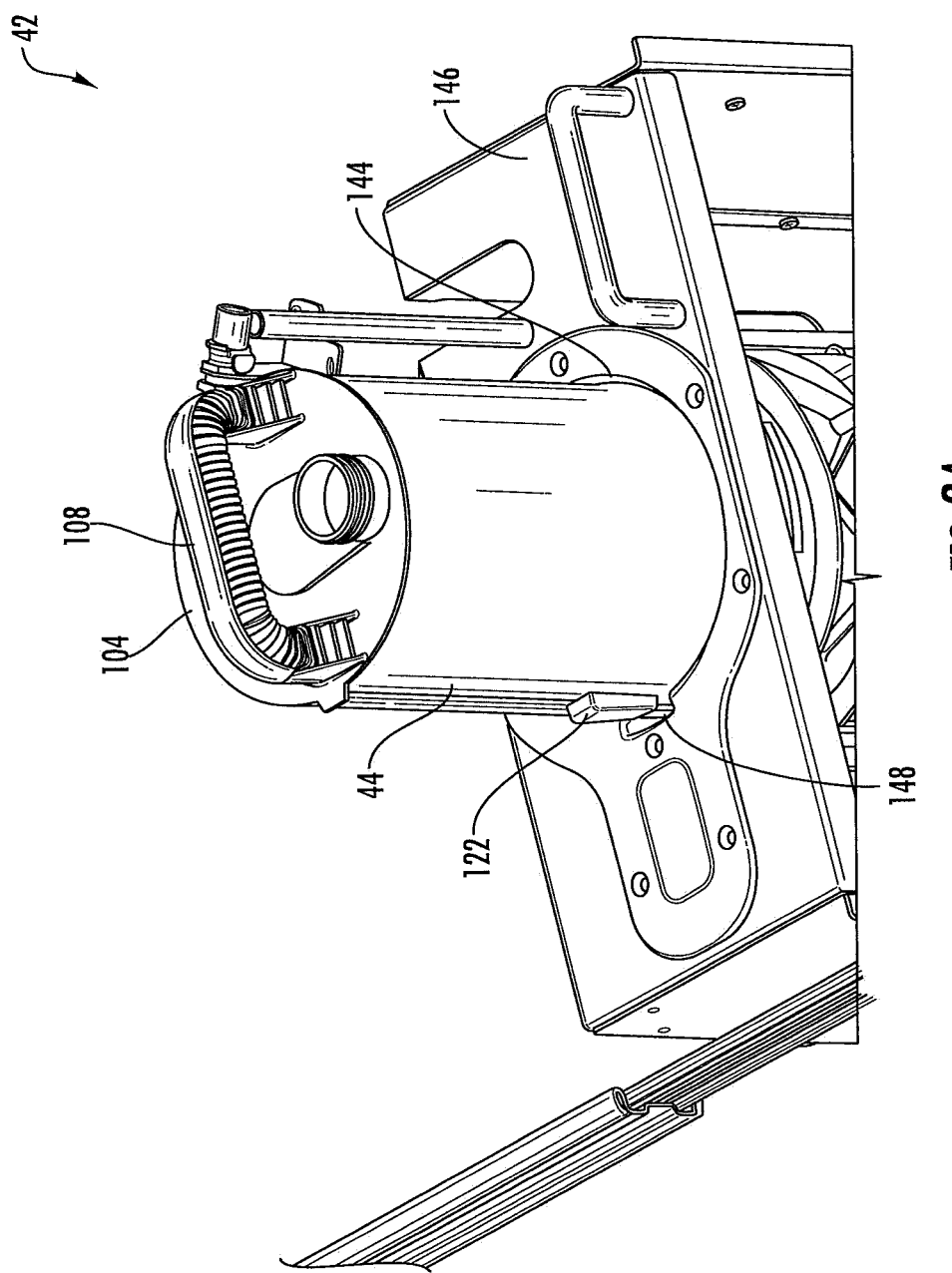
FIG. 8A is an isometric view of an embodiment of a resin container being inserted into an opening in an upper portion of a receptacle.
Figure 8B:
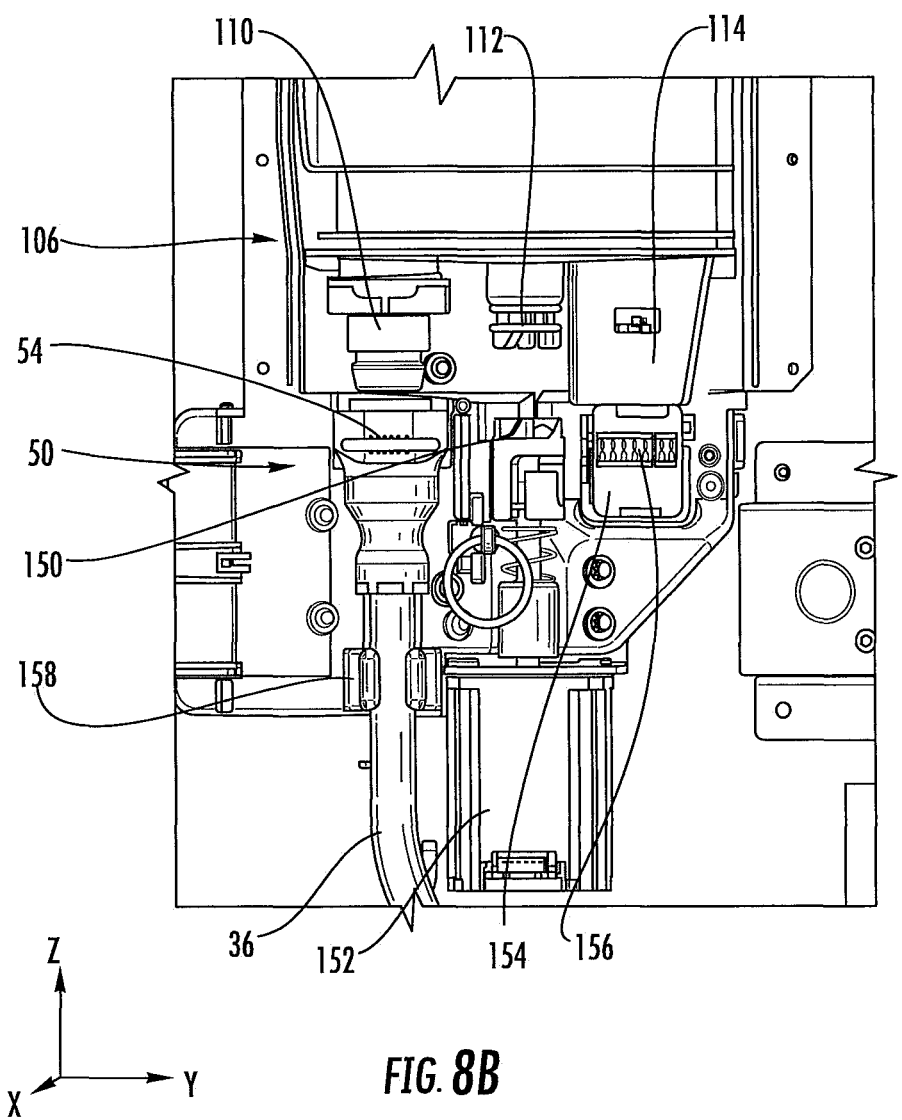
FIG. 8B is a side view of an embodiment of a resin container about to be coupled to an interface portion.
Figure 8C:
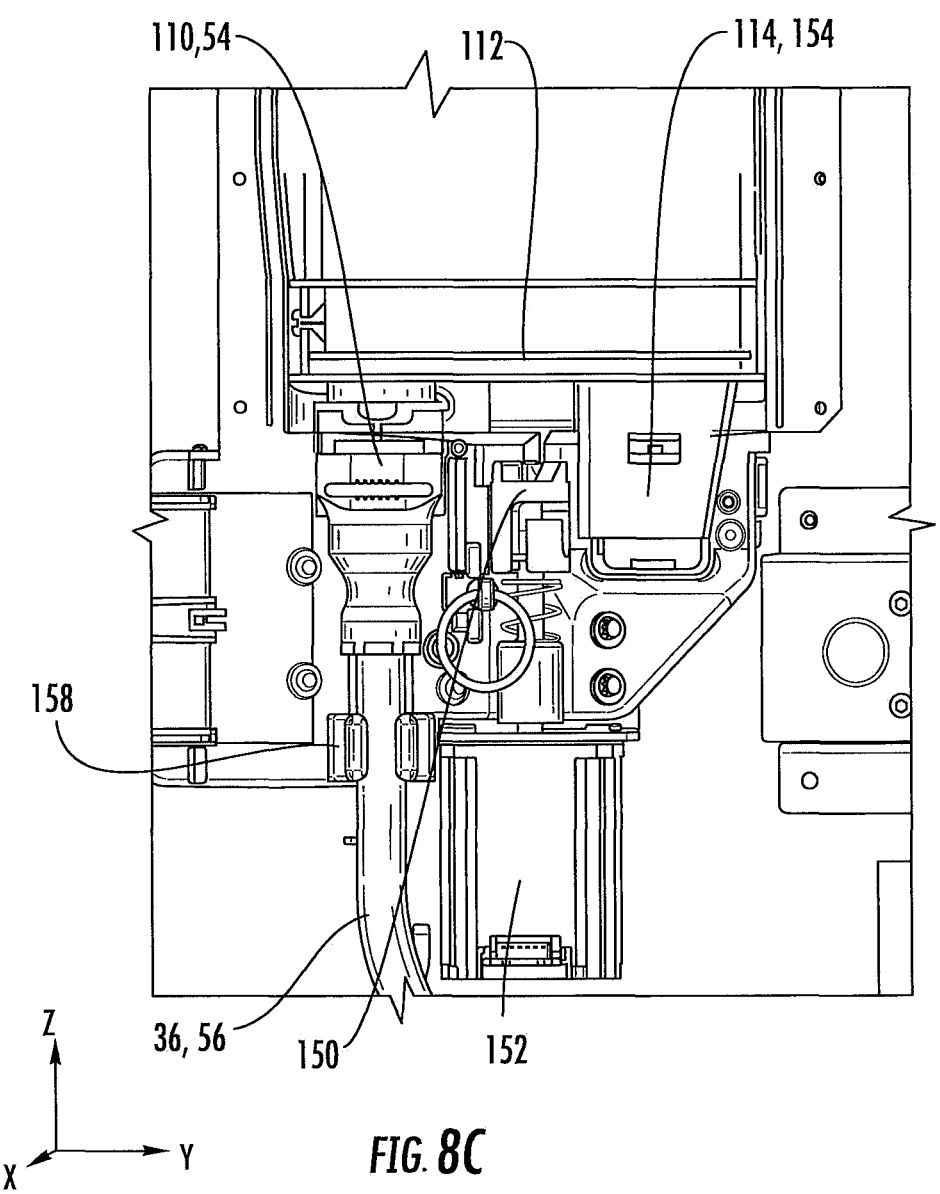
FIG. 8C is a side view of an embodiment of the resin container coupled to the interface portion.

FIGS. 8A-C depict an embodiment of a progression of the resin container 44 being installed in the receptacle 42. FIG. 8A is an isometric view depicting the resin container 44 being initially inserted into an opening 144 in an upper portion 146 of the receptacle 42. The opening 144 is complementary to an outside vertical surface of the resin container 44. The opening includes a slot 148 that needs to be aligned with the aligning feature 122 for the resin container to be installed. The slot 148 assures that the resin container 44 is installed in a proper orientation with respect to the vertical axis Z and aligned in X and Y.

FIG. 8B depicts the leading end 106 of resin container 44 about to connect with the lower interface portion 50 of the receptacle 42. The lower interface portion 50 includes the following features: (1) Fluid inlet 54 of the conduit assembly 36; (2) a motorized rotary actuator 150 coupled to stirring motor 152, (3) Electrical connector 154 with laterally extending electrical contacts 156. The electrical contacts 156 can be spring contacts that extend from the connector in the X direction.

The leading end 106 of the resin container 44 includes the fluid outlet 110, the gear 112, and the electrical connector 114 which are in alignment with the lower interface portion 50 features as a result of the action of the aligning feature 122 within slot 148. The fluid outlet 110 of resin container 44 is aligned with fluid inlet 54 of conduit assembly 36. Gear 112 is in alignment with motorized rotary actuator 150. Container electrical connector 114 contact pads 116 are in alignment with the electrical connector 154 contacts 156. The contact pads 116 face in the −X direction and the spring contacts 156 extend in the +X direction.

FIG. 8C depicts a connection between features extending from the leading end 106 of container 44 and the lower interface portion 50 features. The fluid outlet 110 has been coupled to fluid inlet 54. The motorized rotary actuator 150 has engaged the gear 112. Therefore motor 152 is mechanically coupled to the impeller 128. The spring contacts 156 are compressed against the contact pads 116. A lateral mutual contact force between the electrical connector 114 and the electrical connector 154 is directed along the X axis. Referring to FIGS. 8B and 8C, a sensor 158 is configured to sense the presence of resin in the first conduit 56.

Figure 9:
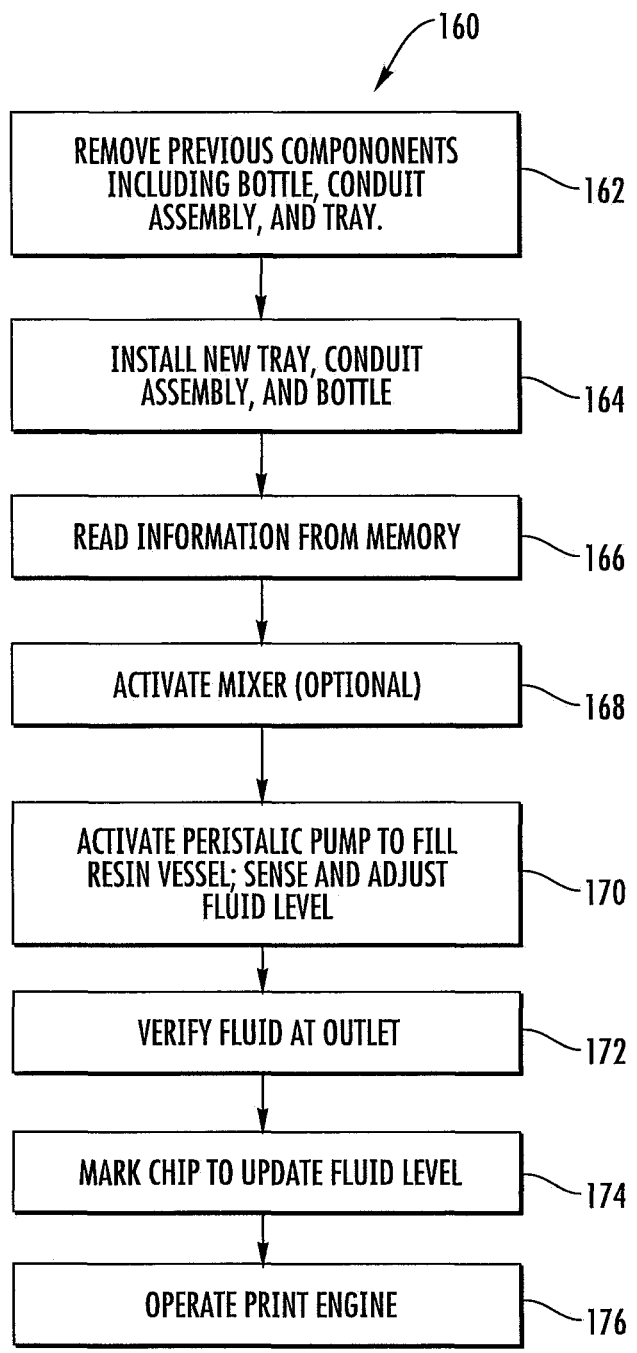
FIG. 9 is a flowchart depicting an embodiment of a method of manufacturing a three dimensional article using a three dimensional printing system. The method of manufacturing includes changing the printing system from an old or first resin to a new or second resin.

FIG. 9 is a flowchart depicting an embodiment of a method of manufacturing a three dimensional article 22 with a new or second resin with a printing system 2 that initially contains an old or first resin. The new resin is of a different type than the old resin. Contaminating the new resin with the old resin would be detrimental to the new resin and its use.

According to step 162, resin-handling components with old resin are removed. The old resin container 44 is lifted out of the receptacle 42. The old conduit assembly 36 is disconnected including unlatching the fluid inlet 54 from the interface portion 50 (see FIGS. 4A-D), disconnecting the pump head 52 from the pump motor system 46 (FIGS. 5A and 5B), and disconnecting the fluid outlet 40 from the print engine 6. Finally, the print engine 6 components (e.g., the resin vessel 10) with the older resin residue are disconnected.

According to step 164, resin-handling components with new resin are installed. A new print engine 6 component is installed (e.g., a clean and empty resin vessel 10). A new conduit assembly is installed 36 including latching the fluid inlet in the interface portion (FIGS. 4D to 4A), coupling the pump head 52 to the pump motor system 46, and mounting the fluid outlet 40 to supply resin to the print engine 6. Finally a resin container 44 with the new resin is installed in the receptacle 42 (FIGS. 8A-C).

According to step 166, the controller 8 can then read from and write to the information storage device 118 as a result of the electrical connection between connectors 114 and 154. If the new resin requires stirring, then the stirring motor 152 is activated according to step 168.

According to step 170, the controller 8 activates the pump motor 92 to begin pumping resin from the resin container 44, through the conduit assembly 36, and to the resin vessel 10. The controller concurrently monitors sensor 38 to avoid overfilling the resin vessel 10. Step 170 can continue to operate repeatedly to maintain a proper resin level in resin vessel 10.

According to step 172, the controller receives a signal from sensor 158 indicative of whether resin is present in the first conduit 56. If there is no resin in first conduit 56, then the system may halt and require installation of a new resin container 44 or a correction of a system error. According to step 174, the information storage device is updated according to an estimate or calculation of resin remaining in the internal reservoir 124. According to step 176, the print engine 6 is operated to manufacture a three dimensional article 22 with the new resin 20.

The steps of manufacturing method 160 can take place in varying orders relative to the flowchart depicted in FIG. 9. The specific embodiments and applications thereof described above are for illustrative purposes only and do not preclude modifications and variations encompassed by the scope of the following claims.

What is claimed:

1. A three dimensional printing system for manufacturing a three dimensional article comprising:
   a print engine configured to receive resin and to form the three dimensional article;
   a receptacle including an upper portion with an opening and a lower interface portion, the lower interface portion includes a latching mechanism;
   a pump motor system;
   a removable conduit assembly including a fluid inlet extending upwardly from the lower interface portion and secured by the latching mechanism, a pump head removably coupled to the pump motor system, and a fluid outlet supplying the resin to the print engine;
   a resin container having an internal reservoir and a leading end and a trailing end relative to a direction of insertion into the receptacle, the leading end including a downwardly extending fluid outlet, installation of the resin container into the receptacle includes passing the leading end through the opening in the top portion, lowering and coupling the leading end to the lower interface portion with the container fluid outlet coupling to the conduit assembly fluid inlet, the removable conduit and resin container provide a sealed fluid path from the internal reservoir to the print engine to enable changing resins without contamination of a new resin with an old resin; and
   a controller configured to operate the print engine, the pump actuator motor, and other portions of the three dimensional printing system;
   wherein the latching mechanism is a latching door mounted to the interface portion with a vertical hinge, swinging the latching door outwardly allows the fluid inlet of the conduit assembly to be removed and replaced.

2. The three dimensional printing system of claim 1 wherein the print engine includes a resin vessel having a lower transparent sheet and a light engine configured to transmit light upwardly through the transparent sheet to harden layers of the three dimensional article.

3. The three dimensional printing system of claim 2 wherein the fluid outlet of the conduit assembly is mounted above a portion of the resin vessel to pour resin into the resin vessel.

4. The three dimensional printing system of claim 1 wherein the latching door includes a detent that swings about the vertical hinge, the latching mechanism includes a latch that pivots about a vertical axis and includes a pin, the pin is held into the detent by a spring when the latching door is closed over the fluid inlet of the conduit assembly.

5. The three dimensional printing system of claim 1 wherein the lower supply interface includes a upwardly extending electrical interconnect, the resin container includes a downwardly extending electrical connector, installation of the resin container into the receptacle causes the downwardly extending connector of the container to electrically couple to the upwardly extending connector of the receptacle.

6. The three dimensional printing system of claim 1 wherein the lower supply interface includes a sensor that sends a signal to the controller indicative of whether resin is present in a portion of the conduit assembly.

7. The three dimensional printing system of claim 1 wherein an outer surface of the resin container and the opening in the upper portion of the receptacle have mutually complementary shapes to prevent the resin container from being inserted backwards into the receptacle.

8. The three dimensional printing system of claim 1 wherein the opening in the upper portion of the receptacle has a guiding feature, the resin container has a vertically aligned guiding feature that engages the receptacle guiding feature to align the resin container as it is inserted into the receptacle.

9. The three dimensional printing system of claim 8 wherein the receptacle guiding feature is a slot and the resin container guiding feature is a ridge.

10. A three dimensional printing system for manufacturing a three dimensional article comprising:
    a print engine configured to receive resin and to form the three dimensional article;
    a receptacle including an upper portion with an opening and a lower interface portion, the lower interface portion includes a latching mechanism;
    a pump motor system;
    a removable conduit assembly including a fluid inlet extending upwardly from the lower interface portion and secured by the latching mechanism, a pump head removably coupled to the pump motor system, and a fluid outlet supplying the resin to the print engine;
    a resin container having an internal reservoir and a leading end and a trailing end relative to a direction of insertion into the receptacle, the leading end including a downwardly extending fluid outlet, installation of the resin container into the receptacle includes passing the leading end through the opening in the top portion, lowering and coupling the leading end to the lower interface portion with the container fluid outlet coupling to the conduit assembly fluid inlet, the removable conduit and resin container provide a sealed fluid path from the internal reservoir to the print engine to enable changing resins without contamination of a new resin with an old resin; and
    a controller configured to operate the print engine, the pump actuator motor, and other portions of the three dimensional printing system wherein the lower supply interface includes a motorized rotary actuator extending upwardly from the lower interface portion, the resin container includes a gear extending downwardly from the leading end and coupled to an impeller inside the internal reservoir, the gear engages the motorized rotary actuator when the resin container is installed in the receptacle to provide motorized stirring of the resin.

11. A three dimensional printing system for manufacturing a three dimensional article comprising:
    a print engine configured to receive resin and to form the three dimensional article;
    a receptacle including a top portion with an opening and a lower interface portion, the lower interface portion includes rotary actuator coupled to a stirring motor and extending upwardly;
    a pump motor coupled to a pump actuator;

a removable conduit assembly including a fluid inlet extending upwardly from the lower interface portion, a pump head removably coupled to the pump actuator, and a fluid outlet supplying the resin to the print engine;

a resin container having an internal reservoir and a leading end and a trailing end relative to a direction of insertion into the receptacle, the leading end including a downwardly extending fluid outlet and a gear coupled to an impeller within the internal reservoir, installation of the resin container into the receptacle causes the container fluid outlet to couple to the fluid inlet of the removable conduit and the gear to couple to the rotary actuator; and a controller configured to operate the print engine, the pump motor, the stirring motor and other portions of the three dimensional printing system.

12. The three dimensional printing system of claim 11 wherein the print engine includes a resin vessel having a lower transparent sheet and a light engine configured to transmit light upwardly through the transparent sheet to harden layers of the three dimensional article.

13. The three dimensional printing system of claim 12 wherein the fluid outlet of the conduit assembly is mounted above a portion of the resin vessel to pour resin into the resin vessel.

14. The three dimensional printing system of claim 11 wherein the gear is centrally located at the leading end of the resin container.

15. The three dimensional printing system of claim 11 wherein the lower interface of the receptacle includes an upwardly extending electrical interconnect, the leading end of the resin container includes a downwardly extending electrical connector, installation of the resin container into the receptacle causes the downwardly extending connector of the container to electrically couple to the upwardly extending connector of the receptacle.

16. The three dimensional printing system of claim 15 wherein, within the lower interface of the receptacle, the fluid inlet, the rotary actuator, and the electrical connector are substantially arranged along a line.

17. The three dimensional printing system of claim 16 wherein the gear centrally is located within the leading end of the resin container.

* * * * *